United States Patent Office 3,098,867
Patented July 23, 1963

3,098,867
PROCESS FOR PRODUCING POLYCARBOXYLIC ACIDS AND ESTERS
Carl S. Marvel, Urbana, and Robert D. Vest, Champaign, Ill., assignors to the United States of America as represented by the Secretary of the Air Force
No Drawing. Filed July 11, 1958, Ser. No. 748,094
13 Claims. (Cl. 260—485)

This invention concerns a plastic as a new composition of matter inclusive of the process by which the plastic is made. The term plastic is used in this connection to refer to a characteristic of the composition of matter of this invention. The invention more particularly concerns the synthesis of monomers, of which α,α'-dimethylenedioic acid derivatives may be taken as being illustrative, and their polymerization by heat and catalysis in the production of a transparent glass-like material with a melting range which is high as compared with the melting range of other plastics of comparable structural and optical characteristics.

As a background for imparting a clear understanding of the present invention as claimed, the term plastic is applied commonly to a material which is formative in being capable of being molded to a contour or a shape and which will retain that shape when force is removed. A monomer is a compound of definite structure and of low molecular weight capable of combining with itself or other simple compounds to form polymers, i.e., plastics, synthetic resins, etc., and hence may be regarded as being a polymer building block. Polymerization is the combination of a plurality of simple molecules into a larger molecule. A polymer is the product of a polymerization process and is characterized by physical properties which are distinct from the physical properties of the monomer or the monomers out of which the polymer is made. Polymer characteristics in addition to high molecular weight may have high tensile strength, elasticity, ability to form fibers, etc.

Three methods or ways of accomplishing polymerization which are contemplated hereby are: bulk polymerization, emulsion polymerization and solution polymerization. The polymerization mechanism in this invention is alternately intra and inter molecular which form rings in the polymer molecule. Bulk polymerization of the monomers contemplated hereby produces a material which is characterized by a limited solubility in such organic solvents as the lower alcohols, ether, acetone, benzene, chloroform, etc. This limited solubility indicates the presence of some cross linking mechanism in the polymerization process. Emulsion and solution polymerization produce materials that are characterized by being completely soluble in the above identified organic solvents, indicating very little or no cross-linking. The products of the polymerization of the monomers contemplated herein are confirmed by their chemical and physical characteristics and are of interest to industry as transparent, thermally stable materials.

Publications of interest are the High Polymer series by Interscience Publishers, Inc., New York, N.Y., of which series volume 11 on Polyethylene by Piaff and Allison, published in 1956 is representative; The Chemistry of Phenolic Resins by R. W. Martin, published in 1956 by John Wiley & Sons, Inc., New York, N.Y.; Polymer Processes and Vinyl and Related Polymers both by C. E. Schildknecht, published in 1956 and in 1952, respectively, by John Wiley & Sons, Inc., New York, N.Y., etc., and Organic Chemistry by Fieser and Fieser, published in 1956 by Reinhold Publishing Corporation, New York, N.Y. Radiation productions of plastics with improved physical characteristics are described in the magazine Nucleonics for April 1958 at pages 73 to 77, inclusive.

A brief summary of the invention follows indicating its nature and substance together with a statement of the object of the invention commensurate and consistent with the invention as claimed and setting out the exact nature, the operation and the essence of the invention complete with proportions and the techniques that are necessary for its use, together with the purpose of the invention. The presentation is adequate for any person who is skilled in the art and science to which the invention pertains, to use it without involving extensive experimentation. The best mode of carrying out the invention is presented by the citing of a specific operative example inclusive of the preparation and the use of at least one example of the invention.

The present invention discloses the art, the process and the method for accomplishing the synthesis and the polymerization of α,α'-dimethyleneadipic, pimelic and suberic acid derivatives, or monomers as described by the inventors in the American Chemical Society Journal, volume 79, dated November 5, 1957, beginning at page 5771, which may be regarded therefore as being an explanatory part hereof. The relationships between the acids here concerned will be apparent from the chart:

Adipic acid $COOH(CH_2)_4COOH$ or hexanedioic acid
Pimelic acid $COOH(CH_2)_5COOH$ or heptanedioic acid
Suberic acid $COOH(CH_2)_6COOH$ or octanedioic acid The invention has as objects the provision of a clear plastic which is thermally stable when used as canopies in high speed aircraft and the like, together with the compositions and the disclosed processes for making the plastic.

Pimelic acid is a normal heptanedioic acid or is a linear or a straight chain seven carbon molecule with a COOH group at both of its ends. The pimelates are esters of this compound. Representative pimelates illustratively discussed herein as examples are methyl and ethyl pimelate esters with α,α'-dimethylene substitution. Adipic and suberic acids are analogous compounds with 6 and 8 carbon atoms in the straight chains, respectively. They polymerize in rings by an alternately intra and inter molecular chain propagation mechanism. The polymerization is accomplished by using as catalyst a peroxide such as benzoyl peroxide. The first step in the polymerization is an intra molecular reaction. The second step is an inter molecular reaction. The monomers follow a variation of vinyl type polymerization in that double bonds are opened by a free radical mechanism. The Schildknecht reference elaborates on vinyl polymerization. Purification of reagents precedes polymerization.

The process contemplated hereby consists of synthesizing a monomer and then polymerizing the monomer. The methods disclosed herein for synthesizing the monomer and for polymerizing the monomer are illustrative successful practices of this invention.

MONOMER SYNTHESIS

The monomers contemplated herein are α,α'-dimethylene derivatives of normal dioic acids that fall into the classes of the structural formulae:

*Class 1*

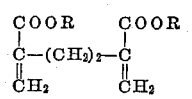

wherein:

R is $CH_3$ in dimethyl-α,α'-dimethylene adipate
R is $C_2H_5$ in diethyl-α,α'-dimethylene adipate
R is H in α,α'-dimethylene adipic acid

Class 2

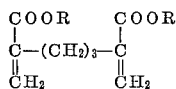

wherein:

R is CH₃ in dimethyl-α,α'-dimethylene pimelate
R is C₂H₅ in diethyl-α,α'-dimethylene pimelate
R is H in α,α'-dimethylene pimelic acid

Class 3

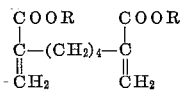

wherein:

R is CH₃ in dimethyl-α,α'-dimethylene suberate
R is C₂H₅ in diethyl-α,α'-dimethylene suberate
R is H in α,α'-dimethylene suberic acid

Class 4

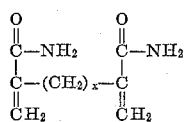

wherein:

X is 2 in α,α'-dimethylene adipamide
X is 3 in α,α'-dimethylene pimelamide
X is 4 in α,α'-dimethylene suberamide The above three structural formulae classes 1, 2 and 3 of the monomer may be expressed by the monomer general structural formula:

(I)   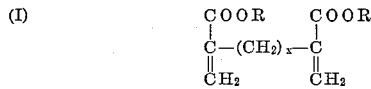

wherein $x$ is 2, 3 or 4, and
R is CH₃, C₂H₅ or H

The fourth structural formula class of the monomer, will be discussed further hereinafter as the monomer of class 4.

The synthesis of the monomer identified by the above general structural Formula I is accomplished illustratively and not exclusively by the three step procedure which is expressed diagrammatically herein below as steps (a) (b) and (c) and to which a step (d) is added to hydrolyze the diester to the diacid when the diacid is desired.

(a) 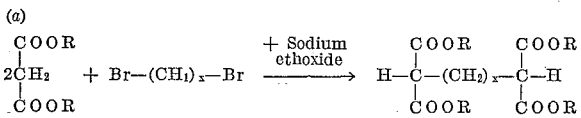

wherein:

R is CH₃ or C₂H₅
$x = 2, 3$ or $4$ (b) 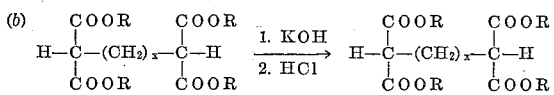

wherein:

R is CH₃, or C₂H₅
$x = 2, 3$ or $4$ (c) 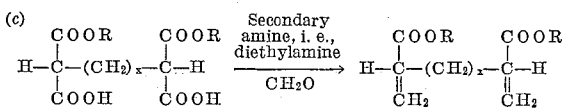

wherein:

R is CH₃ or C₂H₅
$x = 2, 3$ or $4$ (d) 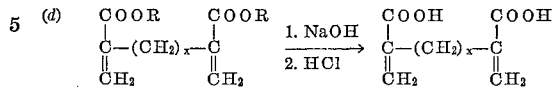

wherein:

R = CH₃, or C₂H₅
$x = 2, 3$ or $4$.

In step (a) of the synthesis of the monomer (I), the malonic ester synthesis method is used, as described beginning on page 220 of the 1956 third edition of the cited Fieser text. In step (a) one of the hydrogen atoms of the methylene group of the malonic ester, which is diethyl malonate, $C_2H_5OOCCH_2COOC_2H_5$, is removed in the presence of an appropriate basic reagent such as sodium ethoxide or sodium hydride. An analogous reaction takes place with the methyl ester.

The malonic ester is activated in the described manner and can be substituted by an alkylhalide with the elimination of the halide ion. In this particular reaction the appropriate alkyldibromide $Br(CH_2)_xBr$ wherein $x$ is 2, 3 or 4, is chosen so that the malonic ester adds in a molar ratio of 2 to 1 malonic ester to alkyldibromide to form a molecule with a di, tri or a tetra methylene linkage between two malonic ester groups.

A first specific successful example of this step (a) synthesis of the monomer (I) uses diethyl malonate and 1,3-dibromopropane as precursors in the preparation of the tetraethyl - 1,1,5,5' - pentanetetracarboxylic intermediate, comprises the use as reaction vessel of a five liter, three necked flask equipped with a dropping funnel, a Hirshberg stirrer and a reflux condenser carrying a drying tube. The production is accomplished under ordinary laboratory conditions.

The flask is charged with 1500 ml. of 99.8% ethanol. With frequent cooling 69.0 g. (3 moles) of sodium in large pieces are added to the ethanol and are completely dissolved. The ethanol solution of sodium is then gently heated while 2320 grams (2210 milliliters or 14.5 moles) of redistilled diethyl malonate are added thereto over a period of one hour. The contents of the flask is then refluxed for three hours to complete the formation of the sodium salt of the malonic ester.

The contents of the flask is then stirred rapidly during the addition of 303 g. (1.5 moles) of redistilled 1,3-dibromopropane by drops over a period of eight hours. The contents of the flask is then refluxed gently for a 24 hour period after which the ethanol is removed by means of an aspirator vacuum.

The inorganic salts and the unreacted base are then removed by several washings with 2% sulfuric acid. The organic layer in the flask is then dried using anhydrous calcium sulfate. The excess diethyl malonate is then removed from the flask under an aspirator vacuum.

The resulting product is then distilled under a diminished pressure through a 12 inch Vigreaux column. The distillate recovered is about 330 g. or 61.5% yield of a viscous oil which has a boiling range between 160 and 170° C. at 0.3 mm. mercury pressure and an index of refraction or $N_D$ at 25° C. of 1.4409. The literature states that tetraethyl-1,1,5,5-pentanetetracarboxylate has a boiling range of 198–202° C. at a pressure of 2.5 mm. mercury and has a boiling range 259–269° C. at 100 mm. Hg and $N_D^{20}$ of 1.4399.

The yield is increased to 80% by heating the reaction mixture after the 1,3-dibromopropane is added under reflux for nine hours and by distilling off the excess malonic ester from the reaction mixtures using a vacuum pump. Using this latter procedure the recovery is from 1745 to 1840 g. (90 to 100%) of original malonic ester.

A successful step (a) in the monomer (I) synthesis is the preparation of tetraethyl-1,1,4,4-butanetetracarboxylate that is similar to that reported for tetraethyl-1,1,5,5-pentanetetracarboxylate, by about the same procedure. From 94 g. (0.5 mole) of redistilled ethylene bromide is obtained from about 25.6 g. of a clear oil of boiling range 151 to 153° C. at 0.3 mm. Hg pressure and $N_D^{25.5}$ of 1.4393. The infrared spectrum of the product is almost identical to that of tetraethyl-1,1,5,5-pentanetetracarboxylate.

A third example of step (a) in the synthesis of the monomer (I) is the making of tetramethyl-1,1,5,5-pentanetetracarboxylate. The synthesis of this tetraester is accomplished by a modification of the first example of step (a). Under anhydrous conditions, 992 g. (7.50 moles) of redistilled dimethyl malonate and 151.5 g. (0.75 mole) of 1,3-dibromopropane are reacted in the presence of sodium methoxide made by dissolving 34.5 g. (1.50 moles) of sodium in 700 ml. of anhydrous methanol. After the workup about 779 g. (5.90 moles) of dimethyl malonate of boiling point 90 to 91° C. at 24 mm. Hg pressure and 155 g. (0.510 mole) of tetramethyl-1,1,5,5-pentanetetracarboxylate may be recovered to give a 71% yield. The product has a boiling range of 144–167° C. at 0.2 to 1.5 mm. Hg pressure and a melting range of 44 to 45° C. A portion of the product may be recrystallized from petroleum ether of boiling range 40 to 60° C. to yield white crystals which have a melting range of 44.0 to 45.0° C. The infrared spectrum is consistent with that expected for a tetramethyl ester. The product analyzes C 51.17% and H 6.60%, as compared with $C_{13}H_{20}O_8$ calculated analysis of C 51.31% and H 6.63%.

A fourth step (a) example of the synthesis of the monomer (I) is the making of tetraethyl-1,1,6,6-hexanetetracarboxylate. The synthesis of this product is a modification of the first example. 972 g. (6 moles) of redistilled diethylmalonate are combined with 108 g. (0.5 mole) of 1,4-dibromobutane and are reacted in the presence of 23 g. (1.0 mole) of sodium dissolved in 500 ml. of absolute alcohol. After the work-up, the product is distilled under diminished pressure and yields about 28.5 g. (0.076 mole) of the tetraester with a boiling range 160–165° C. at 0.7 to 0.5 mm. pressure and $N_D^{20}$ of 1.4452. The infrared spectrum is essentially identical with that or 1,1,5,5-pentanetetracarboxylate.

Step (b) in the synthesis of the monomer (I) is a simple semihydrolysis with a strong base, such as sodium hydroxide or potassium hydroxide, followed by the acidification of the reactants with a mineral acid such as hydrochloric acid or sulfuric acid, to yield the desired diester-diacid.

A first example of the step (b) synthesis of the monomer (I) is the synthesis of diethyl-α,α'-dicarboxypimelate from tetraethyl-1,1,5,5-pentanetetracarboxylate. In this synthesis the procedure for the semihydrolysis of malonic ester is used. Into a one-liter capacity three-necked flask equipped with a magnetic stirrer and a reflux condenser carrying a drying tube is placed 106.8 g. (0.3 mole) of tetraethyl-1,1,5,5-pentanetetracarboxylate, 39.5 g. (0.6 mole) of potassium hydroxide and one liter of 99.8% ethanol.

The mixture is heated under reflux for 24 hours during which time the dipotassium salt will precipitate. A high vacuum pump is used to remove the ethanol vapor from the flask, leaving a yellow paste. The yellow paste is dissolved in 650 ml. of distilled water. The resulting solution is alkaline and is extracted with 100 ml. of ether to remove any unhydrolyzed tetraester and any diethylpimelate formed by the decarboxylation of the desired product.

The resulting alkaline solution is then transferred to a continuous extraction apparatus and is cooled to −10° C. The cooled solution is then simultaneously acidified with cold 6 N hydrochloric acid and is extracted with cold diethyl ether. The aqueous layer is maintained at a temperature between −10° C. and 0° C. while sufficient acid is added to lower the pH to 2. The extraction is continued for about three hours after the pH of 2 is reached. The ether extract is then removed under diminished pressure at room temperature. The product is very sensitive to heat and its temperature is maintained at below 40° C. The experimental yield is about 97 g. (0.319 mole) of a yellow oil $N_D$ at 25° C. of 1.441.

A second example using the step (b) reaction for the synthesis of the monomer (I) as diethyl-α,α'-dicarboxyadipate from tetraethyl-1,1,4,4-butanetetracarboxylate is a semihydrolysis such as that described for the first example for step (b). Using the step (b) reaction 15.6 g. (0.00956 mole) of tetraethyl-1,1,4,4-butanetetracarboxylate are treated as described above for the first example and yield 17.0 g. of a viscous oil of $N_D$ 1.435 at 25.5° C.

A third example of the step (b) reaction in the synthesis of the monomer (I) is the preparation of diethyl-α,α'-dicarboxysuberate using the method for the preparation of diethyl-α,α'-dicarboxypimelate. From 25.8 g. (0.076 mole) of tetraethyl-1,1,6,6-hexanetetracarboxylate are obtained 42.5 g. (0.134 mole) of diethyl-α,α' dicarboxysuberate which requires purification.

A fourth example using the step (b) reaction for the synthesis of the monomer (I) is the preparation of dimethyl-α,α'-dicarboxypimelate which starts with 60.9 g. (0.20 mole) of tetramethyl-1,1,5,5-pentanetetracarboxylate which is treated with the theoretical amount of potassium hydroxide in anhydrous methanol. The dipotassium salt will not precipitate during the course of the reaction, as is observed with the diethyl analog, but as the ethanol is removed under diminished pressure, the expected white paste is formed. The yield of product is 56.0 g. (0.203 mole).

In the step (c) synthesis of the monomer (I), a Mannich reaction is used. Formaldehyde and a secondary amine are reacted with the appropriate α,α'-dicarboxydiester to form the Mannich base which is decomposed by making the solution slightly alkaline to a pH of 9 with the addition of a mineral base, such as potassium hydroxide or sodium hydroxide.

A first example of step (c) of the synthesis of the monomer (I) is the conversion of diethyl-α,α'-dicarboxypimelate to diethyl-α,α'-dimethylenepimelate. It begins with a 500 ml. flask equipped with a magnetic stirrer and a reflux condenser. Into the flask are placed 93.5 g. (0.308 mole) of diethyl-α,α'-dicarboxypimelate and 25 ml. of distilled water. This solution is neutralized with 44.4 g. (0.609 mole) of diethylamine while the flask is cooled in a salt-ice bath. While this mixture is being warmed to room temperature, 97.5 g. (1.2 moles) of 37% aqueous formaldehyde are added and the mixture is stirred and is heated gently for 24 hours. After this time sufficient potassium hydroxide is added to raise the solution pH to 9 and the product which forms a second layer, is removed by the use of a separatory funnel. The organic layer is diluted with an equal volume of diethyl ether, washed with concentrated hydrochloric acid, dried with anhydrous magnesium sulfate and concentrated to yield about 31.0 g. (0.129 moles) of impure product. The impure product is distilled under a diminished pressure through a 12 inch Holtzman column to provide as an end product about 15.1 g. (0.0628 mole) of diethyl-α,α'-dimethylenepimelate, with a boiling range of 81 to 82° C. at a pressure of 0.1 mm. Hg, and $N_D$ at 25° C. of 1.4490.

A second example of step (c) of the synthesis of the monomer (I) as diethyl-α,α'-dimethyleneadipate from diethyl-α,α'-dicarboxyadipate is accomplished through a procedure corresponding to the first example of step (c) beginning with the adipate instead of the pimelate and using the Mannich reaction. The Mannich reaction is carried out by using 37% formalin and diethylamine. From 17.0 g. of crude diethyl-α,α'-dicarboxyadipate and the proper reagents will be obtained about 5.0 g. (0.022 mole) of a colorless oil with a boiling range of 69 to 70° C. at a pressure of 0.2 mm. of mercury and a $N_D$ at 25.8° C. of 1.4516.

A third example of step (c) of the synthesis of the monomer (I) is the formation of diethyl-α,α'-dimethylenesuberate. It is accomplished by the above procedure for diethyl-α,α'-dimethylenepimelate, using aqueous formaldehyde and diethylamine. From 42 g. (0.13 mole) of crude diethyl-α,α'-dicarboxysuberate is obtained about 5.0 g. (0.020 mole) of diethyl-α,α'-dimethylenesuberate of boiling range 81 to 82° C. at a pressure of 0.1 mm. of mercury and $N_D$ at 25° C. of 1.4500.

Modifications of this third step (c) synthesis of the monomer (I) give better results. Gaseous dimethylamine is passed through the solution in excess until the solution has a pH of 9, which provides better yields. Since the product of the reaction is a reactive monomer, small amounts of polymer are frequently obtained. The presence of these small amounts of polymer may be minimized by shortening the heating period necessary to form a second layer. The addition of water soluble inhibitors, such as sodium nitrite, is helpful.

A fourth example of step (c) of the synthesis of the monomer (I) is the formation of dimethyl-α,α'-dimethylenepimelate by the Mannich reaction. It is carried out by a modification of the procedure reported for the diethyl analog. Into a 500 milliliter or 50 ml. flask equipped with a magnetic stirrer and cooled in an ice bath, are placed 56.0 g. (0.20 mole) of dimethyl-α,α'-dicarboxypimelate and 200 ml. of distilled water. The contents of the flask are stirred as dimethylamine in the gaseous state is passed through the mixture until the diacid has dissolved and the solution has reached a pH of 9. While the solution warms to room temperature, 64 g. (0.40 mole) of 37% aqueous formaldehyde is added and the reaction mixture is heated under gentle reflux for four hours. After cooling, the porduct is extracted with 100 ml. of low-petroleum ether of boiling range 40 to 60° C. The extracts are washed once with concentrated hydrochloric acid to remove any amines present. The extracts are then cooled to −10° C. overnight to yield about 17.3 g. (0.0816 mole) of dimethyl-α,α'-dimethylenepimelate of melting range 34 to 35° C.

The step (d) of the monomer (I) synthesis, which is necessary when the diacid monomer is desired instead of a diester monomer, is a simple hydrolysis with a strong base, such as sodium hydroxide or potassium hydroxide to form the salt, followed by a mineral acid, such as $H_2SO_4$ or HCl to form the acid.

An illustrative example of the step (d) of monomer (I) synthesis is the making of α,α'-dimethylenepimelic acid from diethyl-α,α'-dimethylenepimelate. Into a 50 ml. flask equipped with a magnetic stirrer are placed 4.8 g. (0.02 mole) of crude diethyl-α,α'-dimethylenepimelate, 2.0 g. (0.05 mole) of sodium hydroxide and 25 ml. of distilled water. The solution is stirred at room temperature for 36 hours after which time the solution is homogeneous. The solution is then acidified to pH 1 with concentrated HCl and is cooled to −10° C. for several hours. White crystals form. The crystals are filtered out, and are air dried. The crystals will weigh about 2.46 g. (0.0134 mole) which is a 92% yield. The crystals are hygroscopic and have a melting range between 75.5 and 85.0° C. A sample may be recrystallized with distilled water to give long, white needles with a melting range of 105 to 106° C. The final product is not hygroscopic. By the same procedure 70.0 g. (0.291 mole) of crude diethyl-α,α'-dimethylenepimelate may be hydrolyzed with the appropriate amount of sodium hydroxide. A yield of 41.7 g. (0.227 mole) of crude diacid is obtained. The crude product may be recrystallized to obtain about 11.4 g. (0.062 mole) of pure diacid with a melting point of 105.0 to 105.8° C.

To prepare the monomer of class 4, which has the structural formula

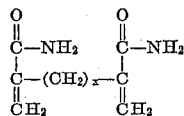

two additional reaction steps are necessary, using as precursors compounds of the following types:
(1) α,α'-Dimethyleneadipic acid;
(2) α,α'-Dimethylenepimelic acid; and
(3) α,α'-Dimethylenesuberic acid.

The synthesis of the above compounds has been described herein.

These additional steps are:

(A)
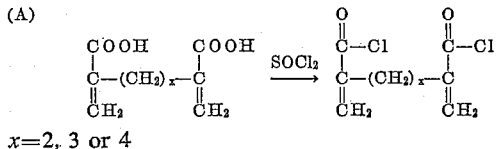

$x = 2, 3$ or $4$ (B)
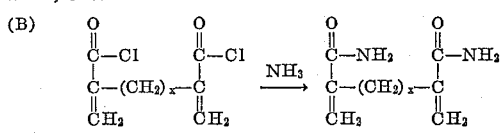

$x = 2, 3$ or $4$

Step A is accomplished by adding a strong chlorinating agent to the diacid, such as $SOCl_2$, $PCl_3$ or $PCl_5$ to form the bis-(acylchloride).

An illustrative example is the conversion of α,α'-dimethylenepimelic acid to α,α'-dimethylenepimelyl chloride by placing in a 50 ml. flask equipped with a short column and a drying tube, 6.0 g. (0.0326 mole) of dry α,α'-dimethylenepimelic acid where it is reacted with 7.1 ml. (0.098 mole) of thionyl chloride at 60° C. for two hours. The excess thionyl chloride is then removed under diminished pressure to yield about 9.0 g. (0.0407 mole) of product.

Step B takes place when the acyl chloride is added to concentrated ammonia. An illustrative example is the formation of α,α'-dimethylenepimelamide from α,α'-dimethylenepimelyl chloride. 9.0 g. (0.040 mole) of α,α'-dimethylenepimelyl chloride are poured slowly with stirring into 150 ml. of concentrated ammonia cooled to 0° C. A white crystalline material is formed and is removed by filtration. The filtrate is concentrated to about one half its original volume to yield a second crop of crystals. The yield of α,α'-dimethylenepimelamide is 4.94 g. (0.0272 mole).

POLYMERIZATION

*Solution Polymerization.*—Polymerization in solution can be accomplished with an appropriate solvent such as methanol, ethanol, benzene, etc. and a free radical catalyst such as benzoyl peroxide.

Illustrative examples of solution polymerization with the above described monomers are:

The preparation of polydiethyl-α,α'-dimethylenepimelate is accomplished by introducing into a 300 ml. flask equipped with a magnetic stirrer and a reflux condenser 5.0 g. (0.021 mole) of the monomer, diethyl-α,α'-dimethylenepimelate, with 200 ml. of absolute alcohol and 50 mg. (0.00021 mole) of benzoyl peroxide. The solution is heated under reflux for seven hours at which time distilled water is added to precipitate the polymer. After two reprecipitations, using an ethanol-water system, the polymer is filtered out and is dried at 80° C. for 24 hours at 1.0 mm. mercury pressure. The polymer is heated at 125 to 135° C. and it forms a clear, thick, glass-like melt. The product shows no unsaturation in the infrared spectrum (chloroform solution) and does not react with bromine in carbon tetrachloride.

The preparation of polydimethyl-α,α'-dimethylenepimelate is accomplished by introducing into a 50 ml. round-bottomed flask 719.2 mg. (0.00339 mole) of the monomer dimethyl-α,α'-dimethylenepimelate, 1.2 mg. (49×10⁻⁷ mole) of benzoyl peroxide and 20 ml. of absolute ethanol. The solution is refluxed for 9 hours and then the solution is poured into methanol where a precipitate separates out. A small portion of about 47 mg. of insoluble polymer remains in the reaction flask. The soluble portion, 627 mg. is dried and can be used for viscosity determinations. The product is purified by one reprecipitation with methanol. The purified product, in a solution of 0.265 g. in 100 ml. chloroform, has an intrinsic viscosity at 25° C. of 0.555, which indicates a molecular weight of about 10 to 15×10⁴.

The preparation of poly-α,α'-dimethylenepimelic acid is accomplished by placing in a 3 ounce polymerization bottle 0.5 g. of the monomer, α,α'-dimethylenepimelic acid, and 10 ml. of distilled water. The solution is warmed on a steam bath to dissolve the monomer. Purified nitrogen is then passed through the solution for about one minute to remove air. The solution is warmed to redissolve any monomer which crystallized. To the warm solution is added 1.0 ml. of 1% potassium persulfate solution. The bottle is quickly capped and is placed in a 60° C. bath for 17 hours. The polymer precipitates during this time and is removed by filtration. The polymer is purified by dissolving it in dilute base and then by pouring the alkaline solution into dilute hydrochloric acid. The product is hygroscopic and when heated it will not melt but it does decompose at about 460° C. The infrared spectrum of the polymer shows unconjugated acid and no unsaturation. The polymer yield weighs 0.27 g. and analyzes C 54.70% and H 6.71%.

*Emulsion polymerization.*—Emulsion polymerizations are conducted by making a water emulsion of the monomer with soap and using a free radical catalyst, such as potassium persulfate. They are conducted in a temperature range of about 50 to 70° C.

Polydiethyl-α,α'-dimethylenepimelate, made by emulsion polymerization, is prepared by charging a four ounce, screw cap polymerization bottle with 5 g. (0.02 mole) of the monomer, diethyl-α,α'-dimethylenepimelate, 5 g. of Office of Rubber Reserve soap or ORR soap (3% solution) and 50.0 mg. (0.000185 mole) of potassium persulfate. The bottle is swept for three minutes with nitrogen, capped, placed in a bath held at 50° C. and tumbled for four hours. The resulting polymer is precipitated by pouring the contents of the bottle into 25 ml. of H₂SO₄—NaCl coagulant. The product is purified by reprecipitation in an ethanol-water system. The resultant polymer is then thoroughly dried. Variations in procedure includes changes in polymerization times up to four days; changes in temperatures from room temperature to 100° C.; changes in the use as initiators of benzoyl peroxide or potassium persulfate; in emulsifiers; in suspension agents; in high speed stirring instead of tumbling, etc.

Polydimethyl-α,α'-dimethylenepimelate as the product made by emulsion polymerization is prepared by placing in a four ounce polymerization bottle 4.740 g. (0.0223 mole) of the monomer, dimethyl-α,α'-dimethylenepimelate, 8.0 g. of ORR soap (3% solution) and 0.5 ml. of a 3% aqueous solution of potassium persulfate. The bottle is swept for three minutes with nitrogen, capped, placed in a 50° C. bath and is tumbled for 24 hours. The polymer is precipitated by pouring the contents of the bottle into 25 ml. of sodium chloride-sulfuric acid coagulant and is purified by reprecipitation six times in a benzene-methanol system. After thorough drying, about 1 g. of polymer is obtained. The intrinsic viscosity of a solution of 0.241 g. of polymer in 100 ml. of chloroform at 25° C. is 0.73, which indicates a molecular weight of about 200,000 for the polymer. The product is completely soluble in chloroform and its infrared spectrum shows no unsaturation whatsoever. The analysis calculated for $(C_{11}H_{16}O_4)_n$ is 62.25% C and 7.60% H and is actually found to contain 62.37% C and 7.46% H. A benzene solution of this polymer in a Petri dish may be allowed to evaporate at atmospheric pressure. The resulting film is transparent, it can not be scratched with a fingernail but it can be marred with a knife.

*Bulk polymerization.*—Polymerization in bulk is accomplished with a catalyst, such as benzoyl peroxide, in a temperature range of from 50 to 70° C.

Polydiethyl-α,α'-dimethylenepimelate is made by bulk polymerization by inserting into and then sealing within a thick-walled tube or a vial flushed with nitrogen 5.0 g. (0.021 mole) of the monomer, diethyl-α,α'-dimethylenepimelate and 27 mg. of benzoyl peroxide. The sealed tube is heated at 110° C. for five hours. The tube is then heated at 180° C. for ten hours. The tube then contains a clear solid. The clear solid is 80% soluble and its intrinsic viscosity range is from 0.1 to 0.3.

In another procedure 1.0 g. (0.0041 mole) of the same monomer and 10 mg. of benzoyl peroxide are heated under a blanket of nitrogen at 60° C. for 24 hours. The polymer so formed is glass-like and is insoluble in usual organic solvents.

In a third procedure a small vial is charged with 2.616 g. (0.0108 mole) of the same monomer and 27.9 mg. of benzoyl peroxide. The bottle is flushed with nitrogen, capped and is heated at 60° C. for 74 hours. The polymer so made is purified by dissolving it in ethanol and precipitating it by pouring the ethanolic solution into sodium chloride-sulfuric acid coagulant solution. The polymer so obtained weighs 2.03 g., showing a 79% conversion of the monomer, and is soluble in benzene. No significant amount of an insoluble polymer will be isolated. The intrinsic viscosity of the soluble polymer of 296 mg. dissolved in 100 ml. of chloroform is 0.03.

Polydiethyl-α,α'-dimethyleneadipate is made by bulk polymerization by charging a 6 ml. vial with 0.5 g. (0.002 mole) of the monomer, diethyl-α,α'-dimethyleneadipate and 5 mg. of benzoyl peroxide. The vial is then sealed and is immersed in a water bath maintained at 55° C. and is heated for 10 hours. The vial will then contains a clear, sticky polymer. Heating the polymer at 110° C. for one hour will convert it into a clear, non-sticky polymer. The polymer product is insoluble and hence is believed to be crosslinked.

Polydimethyl-α,α'-dimethylenepimelate is made by bulk polymerization by inserting a small sample of the monomer dimethyl-α,α'-dimethylenepimelate into a 1 g. vial, flushing the vial with nitrogen and heating it at 60° C. for 40 hours in an oven. The product is very hard, it has glass-like characteristics and is about 10% soluble in benzene.

Polydiethyl-α,α'-dimethylenesuberate is made by bulk polymerization by charging a 6 ml. sample vial with 1 g. (394×10⁻⁵ mole) of the monomer diethyl-α,α'-dimethylenesuberate and with 10 mg. of benzoyl peroxide. The vial is flushed with nitrogen, capped and shaken until the peroxide has dissolved. The vial is then placed in an oven maintained at 60° C. and is heated for 12 hours. The resulting polymer is clear, hard and is not brittle. It has no definite melting point but will become fluid at about 185° C. A sample of the product, refluxed overnight in benzene, swells to several times its original volume but no more than 5 or 10% of the polymer will dissolve.

It is to be understood that the plastic contemplated hereby is successfully made by the process steps, materials and compositions, in the proportions and under the chemical and physical conditions stipulated herein and that modifications may be made therein to yield comparable results without departing from the scope of the present invention as defined by the claims appearing herein.

We claim:
1. The synthesis of tetraethyl-1,1,5,5-pentanetetracarboxylate by charging a multiple necked reflux flask with

1500 milliliters of 99.8% ethanol; adding to the ethanol with frequent cooling 3 moles of sodium; heating gently the flask containing the ethanol solution of sodium while adding 14.5 moles of redistilled diethyl malonate over a period of one hour; reflux the contents of the flask for the substantially complete formation of the sodium salt of the malonic ester over a representative period of three hours; add to the flask with rapid stirring 1.5 moles of redistilled 1,3-dibromopropane by drops over a period of about eight hours; reflux gently the flask contents; remove the ethanol from the flask; wash the contents of the flask with 2% sulfuric acid for accomplishing the removal of inorganic salts and unreacted base; dry the organic layer in the flask by the addition with agitation of anhydrous calcium sulfate; remove the excess diethyl malonate under an aspirator vacuum; distill the resulting product under a diminished pressure as a viscous oil of a boiling range between 160 and 170° C. at 0.3 mm. mercury pressure and the viscous oil having an index of refraction at 25° C. of 1.4409.

2. The synthesis of tetramethyl-1,1,5,5-pentanetetracarboxylate by reacting in multiple necked reflux flask under anhydrous conditions 7.50 moles of redistilled dimethyl malonate and 0.75 mole of 1,3-dibromopropane and 1.50 moles of sodium in 700 milliliters of anhydrous ethanol; reflux the contents of the flask to the substantially complete formation of the sodium salt of the malonic ester; add to the flask with rapid stirring 1.5 moles of redistilled 1,3-dibromopropane by drops over a period of about eight hours; reflux for about twenty-four hours; and recover dimethyl malonate and tetramethyl-1,1,5,5-pentanetetracarboxylate.

3. The synthesis of tetraethyl-1,1,6,6-hexanetetracarboxylate by charging a multiple necked reflux flask with 6 moles of redistilled diethyl malonate and 0.5 mole of 1,4-dibromobutane and 1 mole of sodium in 500 milliliters of absolute alcohol; reflux the contents of the flask for the substantially complete formation of the sodium salt of the malonic ester over three hours; add to the flask 1.5 moles of dibromopropane by drops over a period of about eight hours; reflux the contents of the flask for about a nine hour period; and distill off the excess malonic ester leaving in the flask tetraethyl-1,1,6,6-hexanetetracarboxylate.

4. The synthesis of diethyl-$\alpha,\alpha'$-dicarboxypimelate from tetraethyl 1,1,5,5-pentanetetracarboxylate by reacting in a multiple necked flask 0.3 mole of tetraethyl 1,1,5,5-pentanetetracarboxylate and 0.6 mole of potassium hydroxide and one liter of 99.8% ethanol; heat the flask under reflux for twenty-four hours; remove from the flask the ethanol vapor; add to the flask 650 milliliters of water; extract the flask contents with 100 milliliters of ether to remove unhydrolized tetraester and diethylpimelate; transfer the flask contents to a continuous extraction apparatus; cool the extraction apparatus to —10° C.; acidify the contents of the cooled extraction apparatus with cold 50% hydrochloric acid to a pH of 2; extract the acidified contents of the cooled extraction apparatus with cold diethyl ether for about three hours; remove the ether extract under diminished pressure; and maintain the temperature of the resultant product at below 40° C.

5. The synthesis of diethyl $\alpha,\alpha'$-dicarboxyadipate from tetraethyl 1,1,4,4-butanetetracarboxylate by reacting in a multiple necked flask 0.00956 mole of tetraethyl 1,1,4,4-butanetetracarboxylate with 0.6 mole of potassium hydroxide and one liter of 99.8% ethanol; heat the flask under reflux for twenty-four hours; remove from the flask the ethanol vapor; add to the flask 650 milliliters of water; extract the flask contents with 100 milliliters of ether to remove unhydrolyzed tetraester and diethyladipate; transfer the flask contents to a continuous extraction apparatus; cool the extraction apparatus to —10° C.; acidify the contents of the cooled extraction apparatus with cold diethyl ether for about three hours; remove the ether extract under diminished pressure; and maintain the temperature of the product at below 40° C.

6. The synthesis of diethyl $\alpha,\alpha'$-dicarboxysuberate from tetraethyl 1,1,6,6-hexanetetracarboxylate by reacting in a multiple necked flask 0.134 mole of tetraethyl 1,1,6,6-hexanetetracarboxylate and 0.6 mole of potassium hydroxide and one liter of 99.8% ethanol; heat the flask under reflux for twenty-four hours; remove the ethanol vapor from the flask; add to the flask 650 milliliters of water; extract the flask contents with 100 milliliters of ether to remove unhydrolyzed tetraester and diethylsuberate; transfer the flask contents to a continuous extraction apparatus; cool the extraction apparatus to —10° C.; acidify the contents of the cooled extraction apparatus with cold 50% hydrochloric acid to a pH of 2; extract the acidified contents of the cooled extraction apparatus with cold diethyl ether for about three hours; remove the ether extract under diminished pressure; and maintain the temperature of the resultant product at below 40° C.

7. The synthesis of dimethyl $\alpha,\alpha'$-dicarboxypimelate from tetramethyl 1,1,5,5-pentanetetracarboxylate by reacting in a multiple necked flask 0.20 mole of tetramethyl 1,1,5,5-pentanetetracarboxylate and 0.6 mole of potassium hydroxide and one liter of anhydrous methanol; heat in the flask under reflux for twenty-four hours; remove the ethanol vapor from the flask; add to the flask 650 milliliters of water; extract the flask contents with 100 milliliters of ether to remove unhydrolyzed tetraester and dimethylpimelate; transfer the flask contents to a continuous extraction apparatus; cool the extraction apparatus to —10° C.; acidify the contents of the cooled extraction apparatus with cold 50% hydrochloric acid to a pH of 2; extract the acidified contents of the cooled extraction apparatus with cold diethyl ether for about three hours; remove the ether extract under diminished pressure; and maintain the temperature of the resultant product at below 40° C.

8. The synthesis of diethyl $\alpha,\alpha'$-dimethylenepimelate by reacting in the manner of the Mannich reaction, in a flask 0.308 mole of diethyl $\alpha,\alpha'$-dicarboxypimelate and 25 milliliters of distilled water with 0.609 mole of diethylamine with the flask cooled in a salt-ice bath; while the mixture is warmed to room temperature add to the flask 1.2 moles of 37% aqueous formaldehyde with stirring and gentle heating for twenty-four hours; add potassium hydroxide to a pH of 9; use a separatory funnel to isolate the product as an organic layer, dilute the isolated organic layer by the addition thereto of an equal volume of diethyl ether; wash the diluted organic layer with concentrated hydrochloric acid; dry the washed organic layer with anhydrous magnesium sulfate; and distill the dried organic layer as diethyl $\alpha,\alpha'$-dimethylenepimelate.

9. The synthesis of diethyl $\alpha,\alpha'$-dimethyleneadipate by reacting in a multiple necked flask 17.0 grams of diethyl $\alpha,\alpha'$-dicarboxyadipate and 25 milliliters of distilled water with 0.609 mole of diethylamine, according to the Mannich reaction, cooled in a salt-ice bath; while the mixture is warmed to room temperature add to the flask 1.2 moles of 37% aqueous formaldehyde with stirring and gentle heating for about twenty-four hours; add potassium hydroxide to a pH of 9; use a separatory funnel to isolate the organic layer by the addition thereto of an equal volume of diethyl ether; wash the isolated organic layer with concentrated hydrochloric acid; dry the washed organic layer with anhydrous magnesium sulfate; and distill the dried organic layer as diethyl $\alpha,\alpha'$-dimethyleneadipate.

10. The synthesis of diethyl $\alpha,\alpha'$-dimethylenesuberate according to the Mannich reaction by reacting in a multiple necked flask 0.13 mole of diethyl $\alpha,\alpha'$-dicarboxysuberate and 25 milliliters of distilled water with 0.609 mole of diethylamine with the flask cooled in a salt-ice bath; while the mixture is warmed to room temperature add to the flask 1.2 moles of 37% aqueous formaldehyde with stirring and gentle heating for twenty-four hours; add potassium hydroxide to a pH of 9; use a separatory funnel to isolate the product as an organic layer; dilute the isolated organic layer by the addition thereto of an equal volume of diethyl ether; wash the diluted organic layer with concentrated hydrochloric acid; dry the washed organic layer with anhydrous magnesium sulfate; and distill the dried organic layer as diethyl α,α'-dimethylenesuberate.

11. The synthesis of dimethyl α,α'-dimethylenepimelate according to the Mannich reaction by introducing into a flask cooled in an ice bath 0.20 mole of dimethyl α,α'-dicarboxypimelate and 200 milliliters of distilled water; stir the flask contents as gaseous dimethylamine is passed through the mixture until the diacid has dissolved and the pH has reached 9; as the solution warms to room temperature 0.40 mole of aqueous formaldehyde is added and the reaction mixture is heated under gentle reflux for four hours; cool the flask and extract the product with 100 milliliters of low petroleum ether of a boiling range between 40 and 60° C.; wash the extract once with concentrated hydrochloric acid to remove amines; and cool the extract overnight at −10° C. to yield dimethyl α,α'-dimethylenepimelate.

12. The synthesis of α,α'-dimethylenepimelic acid by introducing into a flask 0.02 mole of diethyl α,α'-dimethylenepimelate and 0.05 mole of sodium hydroxide and 25 milliliters of distilled water; stir the solution at room temperature for thirty-six hours; acidify the solution to pH 1 with concentrated HCl; cool the flask to −10° C. for several hours; filter out the white crystals formed; and air dry the crystals.

13. The synthesis of diethyl α,α'-dimethylenesuberate according to the Mannich reaction by reacting in a multiple-necked flask 0.13 mole of diethyl α,α'-dicarboxysuberate and 25 milliliters of distilled water with 0.609 mole of diethylamine with the flask cooled in a salt-ice bath; while the mixture is warmed to room temperature add to the flask 1.2 moles of 37% aqueous formaldehyde with stirring and gentle heating for twenty-four hours; pass gaseous dimethylamine in excess through the solution add potassium hydroxide until the solution has a pH of 9; use a separatory funnel to isolate the product as an organic layer; dilute the isolated organic layer by the addition thereto of an equal volume of diethyl ether; wash the diluted organic layer with concentrated hydrochloric acid; dry the washed organic layer with anhydrous magnesium sulfate; and distill the dried organic layer as diethyl α,α'-dimethylenesuberate.

References Cited in the file of this patent

UNITED STATES PATENTS

| | | |
|---|---|---|
| 2,384,574 | Stewart et al. | Sept. 11, 1945 |
| 2,396,785 | Hanford | Mar. 19, 1946 |
| 2,870,196 | Barney et al. | Jan. 20, 1959 |
| 2,976,268 | Milford | Mar. 21, 1961 |

OTHER REFERENCES

Beilstein (4th ed.), vol. 2, page 319 (1929).
Beilstein (4th ed.), vol. 2, page 677 (1942).
Name Reactions in Organic Chemistry Surrey, Academic Press Inc., New York, 1954, pp. 160–161.
Chemistry of Organic Compounds, Noller, W. B. Saunder Co., Philadelphia, 1957, pp. 160 and 791–805.
Organic Chemistry, Fieser et al., Reinhold Publishing Corp., New York, 1956, 3rd edition, pp. 220–221.